(12) United States Patent
Sun et al.

(10) Patent No.: US 10,979,543 B2
(45) Date of Patent: Apr. 13, 2021

(54) STRUCTURE FOR LOW-POWER-LOW-RATE DATA TRANSMISSION

(71) Applicant: NXP USA, Inc., Austin, TX (US)

(72) Inventors: Yakun Sun, San Jose, CA (US);
Hongyuan Zhang, Fremont, CA (US);
Lei Wang, San Diego, CA (US);
Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/226,174

(22) Filed: Dec. 19, 2018

(65) Prior Publication Data

US 2019/0230197 A1 Jul. 25, 2019

Related U.S. Application Data

(63) Continuation of application No. 15/332,531, filed on Oct. 24, 2016, now Pat. No. 10,165,094.

(60) Provisional application No. 62/245,495, filed on Oct. 23, 2015.

(51) Int. Cl.
H04L 29/06 (2006.01)
H04L 27/26 (2006.01)
H04W 4/70 (2018.01)
H04W 72/04 (2009.01)
H04W 84/12 (2009.01)

(52) U.S. Cl.
CPC .......... H04L 69/22 (2013.01); H04L 27/2613 (2013.01); H04W 4/70 (2018.02); H04W 72/0453 (2013.01); H04W 72/0473 (2013.01); H04W 84/12 (2013.01); Y02D 30/70 (2020.08)

(58) Field of Classification Search
CPC ............ H04L 5/0007; H04L 27/2628; H04W 72/0446; H04W 4/005
See application file for complete search history.

(56) References Cited

U.S. PATENT DOCUMENTS 9,698,890 B1 7/2017 Chen et al.
9,942,008 B1 4/2018 Sun et al.
2010/0315953 A1 12/2010 Pare et al.
2012/0324315 A1 12/2012 Zhang et al.
(Continued)

OTHER PUBLICATIONS

Minyoung Park: "IEEE 802.11 ah Specification Framework for TGah", May 1, 2013 (May 1, 2013), pp. 1-76, XP055289166, Retrieved from the Internet: URL:https://mentor.ieee.org/802.11/dcn/11/11-11-1137-15-00ahspecification-framework-for-tgah.docx [retrieved on Jul. 18, 2016].

(Continued)

Primary Examiner — Aristocratis Fotakis

(57) ABSTRACT

Embodiments described herein provides a system for detecting data received in a low power low rate (LPMR) data frame format. The system includes a receiver and control circuitry. The receiver is configured to receive a data frame comprising an LPLR preamble portion and an LPLR data portion following the LPLR preamble portion. The LPLR preamble portion and the LPLR data portion occupy a bandwidth that is less than an allowed bandwidth. The control circuitry is configured to determine a mode of the data frame based on whether the data frame has an additional portion, and detect data field in the LPLR preamble portion from the data frame based on the mode of the data frame.

16 Claims, 7 Drawing Sheets

(56) References Cited

U.S. PATENT DOCUMENTS

| | | | |
|---|---|---|---|
| 2015/0312907 A1 | 10/2015 | Lee et al. | |
| 2015/0327276 A1* | 11/2015 | Rebeiz | H04W 72/0493 370/329 |
| 2015/0334708 A1 | 11/2015 | Lee et al. | |
| 2016/0066321 A1 | 3/2016 | Yu | |
| 2016/0066324 A1 | 3/2016 | Li et al. | |
| 2016/0100396 A1 | 4/2016 | Seok | |
| 2016/0149631 A1 | 5/2016 | Sanderovich | |
| 2016/0150505 A1* | 5/2016 | Hedayat | H04W 72/04 370/329 |
| 2016/0226692 A1* | 8/2016 | Kenney | H04L 69/22 |
| 2016/0227436 A1* | 8/2016 | Vermani | H04W 28/06 |
| 2016/0227532 A1* | 8/2016 | Azizi | H04L 69/22 |
| 2016/0255645 A1* | 9/2016 | Li | H04L 5/0023 370/329 |
| 2016/0330300 A1* | 11/2016 | Josiam | H04L 5/0091 |
| 2017/0013092 A1* | 1/2017 | Chen | H04L 5/003 |
| 2017/0019891 A1 | 1/2017 | Rong et al. | |
| 2017/0048823 A1* | 2/2017 | Bharadwaj | H04B 7/0452 |
| 2017/0048882 A1 | 2/2017 | Li et al. | |
| 2017/0163395 A1 | 6/2017 | Kwak et al. | |
| 2017/0171861 A1 | 6/2017 | Seok | |
| 2017/0289911 A1 | 10/2017 | Kim et al. | |
| 2018/0183640 A1 | 6/2018 | Cariou et al. | |
| 2018/0206192 A1 | 7/2018 | Vermani et al. | |
| 2018/0343614 A1 | 11/2018 | Cao et al. | |
| 2019/0288763 A1* | 9/2019 | Oteri | H04B 7/0697 |
| 2020/0137770 A1 | 4/2020 | Chitrakar et al. | |
| 2020/0220760 A1 | 7/2020 | Huang et al. | |

OTHER PUBLICATIONS

Sameer Vermani: "Preamble format for 1 Mhz", Nov. 7, 2011 (Nov. 7, 2011), XP055035936, Retrieved from the Internet: URL:https://mentor.ieee.org/mentor/bp/StartPage [retrieved on Aug. 21, 2012].

International Preliminary Report on Patentability for International Application No. PCT/US2016/058466 dated Apr. 24, 2018.

International Search Report and Written Opinion dated Mar. 27, 2017 for PCT/US2016/058466, filed Oct. 24, 2016.

Final Office Action dated Aug. 19, 2020 in U.S. Appl. No. 16/141,103.

Moon, S., "802.11ax Preamble Design and Auto-Detection", IEEE 802.11-15/0823r3, Sep. 2015.

Non-Final Office Action dated Nov. 13, 2020 in U.S. Appl. No. 16/141,103.

* cited by examiner

500

|  | BW | FFT | Tone Spacing (KHz) | Tone Plan |
|---|---|---|---|---|
| Example 1 | 10MHz | 64 | 156.25 | 11a or 11ac 20MHz |
| Example 2 | 10MHz | 32 | 312.5 | 11ah 1MHz |
| Example 3 | 5MHz | 64 | 78.125 | 11a or 11ac 20MHz |
| Example 4 | 5MHz | 32 | 156.25 | 11ah 1MHz |
| Example 5 | 2MHz | 64 | 31.25 | 11a or 11ac 20MHz |
| Example 6 | 2MHz | 32 | 62.5 | 11ah 1MHz |

700

|  | FFT | Tone spacing (KHz) | K | Period (us) | L |
|---|---|---|---|---|---|
| Example 1 | 64 | 78.125 | 4 | 3.2 | 5,6,7,8,9,10,... |
| Example 2 | 64 | 78.125 | 8 | 1.6 | 5,6,7,8,9,10,... |
| Example 3 | 64 | 78.125 | 16 | 0.8 | 5,6,7,8,9,10,... |
| Example 4 | 32 | 156.25 | 4 | 1.6 | 5,6,7,8,9,10,... |
| Example 5 | 32 | 156.25 | 8 | 0.8 | 5,6,7,8,9,10,... |

STRUCTURE FOR LOW-POWER-LOW-RATE DATA TRANSMISSION

CROSS REFERENCE TO RELATED APPLICATION

This disclosure is a continuation of U.S. patent application Ser. No. 15/332,531, filed Oct. 24, 2016 (now allowed), which in turn claims the benefit under 35 U.S.C. § 119(e) of U.S. Provisional Application No. 62/245,495, filed on Oct. 23, 2015, which are incorporated herein by reference in their entireties.

FIELD OF USE

This disclosure relates generally to a low-power-low-rate (LPLR) data frame format, and more particularly to providing a structure for LPLR data transmission with low complexity and high reliability.

BACKGROUND

Wireless local area network (WLAN) is a wireless computer network that uses the IEEE 802.11 group of standards that have been used to supply wireless connections for human users, including 11a/b/g, 11n, 11ac, and 11ax. There is an increasing need to provide wireless connections for non-human devices for the Internet of things (IoT), in which physical devices have network connectivity. Such physical devices may be found in vehicles and buildings, and are often embedded with electronics, sensors, and actuators.

SUMMARY

Embodiments described herein provides a system for detecting data received in a low power low rate (LPLR) data frame format. The system includes a receiver and control circuitry. The receiver is configured to receive a data frame comprising an LPLR preamble portion and an LPLR data portion following the LPLR preamble portion. The LPLR preamble portion and the LPLR data portion occupy a bandwidth that is less than an allowed bandwidth. The control circuitry is configured to determine a mode of the data frame based on whether the data frame has an additional portion, and detect a data field in the LPLR preamble portion from the data frame based on the mode of the data frame.

In some implementations, the allowed bandwidth is 20 MHz and the LPLR data frame format is transmitted at a frequency above 1 GHz.

In some implementations, the data format further comprises a legacy preamble portion that precedes the LPLR preamble portion and occupies the allowed bandwidth.

In some implementations, the format is selected between a mixed mode or a single mode, the mixed mode includes a legacy preamble portion that precedes the LPLR preamble portion and occupies the allowed bandwidth, and the single mode includes only the LPLR preamble portion and the LPLR data portion.

In some implementations, the LPLR preamble portion and the LPLR data portion are duplicated in the frequency domain to occupy the allowed bandwidth.

In some implementations, the LPLR preamble portion and the LPLR data portion are duplicated in the frequency domain to occupy a total bandwidth that is less than the allowed bandwidth, and a frequency gap separates adjacent duplicates of the LPLR preamble portion and the LPLR data portion.

In some implementations, the LPLR preamble portion comprises an LPLR short training field, an LPLR long training field, and an LPLR signaling field.

In some implementations, the LPLR long training field is duplicated at least N times in the time domain.

In some implementations, the LPLR long training field is duplicated a first N times in the time domain to form a first set of duplicates that are transmitted over even tones, the LPLR long training field is duplicated a second N times in the time domain to form a second set of duplicates that are transmitted over odd tones.

In some implementations, a duration of the LPLR preamble portion is set based on whether an uplink transmission that includes the LPLR data frame format is solicited or unsolicited.

Another embodiment described herein provides a method of detecting data received in a LPLR data frame format. A data frame is received, including an LPLR preamble portion and an LPLR data portion following the LPLR preamble portion. The LPLR preamble portion and the LPLR data portion occupy a bandwidth that is less than an allowed bandwidth. A mode of the data frame is determined based on whether the data frame has an additional portion. A data field is detected in the LPLR preamble portion from the data frame based on the mode of the data frame.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

This disclosure generally relates to a low-power-low-rate (LPLR) data frame format, as well as a structure for LPLR data transmission with low complexity and high reliability. To provide an overall understanding of the disclosure, certain illustrative embodiments will now be described, including an LPLR data frame format that includes at least an LPLR preamble portion and an LPLR data portion that occupy a frequency bandwidth less than an allowed bandwidth. However, it will be understood by one of ordinary skill in the art that the systems and methods described herein may be adapted and modified as is appropriate for the application being addressed, and that the systems and methods described herein may be employed in other suitable applications, and that such other additions and modifications will not depart from the scope thereof.

Unlike many of the network considerations when human users are involved (which may require high data rate, for example), many IoT devices do not have the same restrictions. In particular, many IoT devices do not need high data rates, but are sensitive to power consumption and coverage. Low-Power-Low-Rate (LPLR) WLAN technology may be used to meet these needs of IoT networks. The systems and methods of the present disclosure provide an LPLR frame structure with low complexity and high reliability.

The examples described herein relate to an LPLR frame that occupies a frequency bandwidth no wider than 20 MHz and may be transmitted over a wide range of frequencies, such as at 2.4 GHz, 5 GHz, below 1 GHz, above 1 GHz or others. In general and as is described below, the LPLR frame includes at least some portions that occupy a frequency bandwidth that is less than an allowed bandwidth (e.g., 20 MHz). The LPLR frame structure described herein provides a 5-10 dB improvement over the existing structures, particularly the legacy preamble, which is described in detail below. With the systems and methods of the present disclosure, data transmission is highly reliable, yet has a relatively low complexity.

Figure 1:
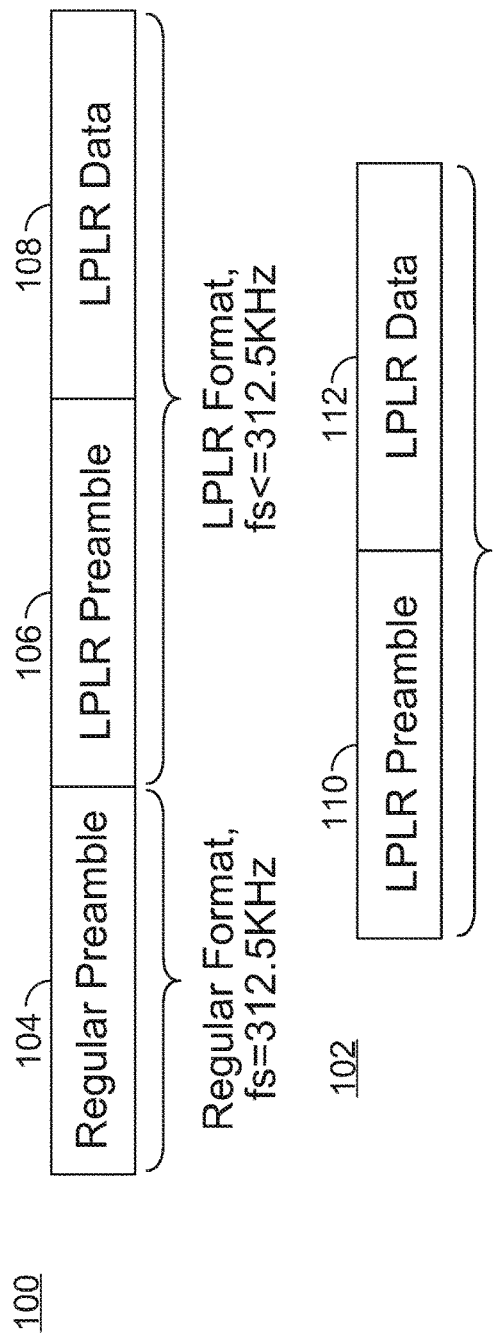
FIG. 1 is a diagram of two illustrative LPLR frame formats for mixed mode and single mode, in accordance with an embodiment of the present disclosure.

FIG. 1 is a diagram of a two illustrative formats of an LPLR frame, in accordance with an embodiment of the present disclosure. The format of an LPLR frame may involve one of two modes: mixed mode and single mode. In the mixed mode LPLR frame format 100, a regular preamble 104 (e.g., a legacy preamble) is used with an LPLR format, which includes an LPLR preamble 106 and LPLR data 108. In the single mode LPLR frame format 102, no regular preamble is used, and only the LPLR format (including the LPLR preamble 110 and the LPLR data 112) is used. In either the mixed mode 100 or the single mode 102, the LPLR preamble 106 and 110 and the LPLR data 108 and 112 occupy a frequency bandwidth that is less than an allowed frequency bandwidth. In an example, the regular preamble may occupy the full allowed bandwidth, which may be 20 MHz. The LPLR preambles and the LPLR data may occupy a frequency bandwidth that is less than 20 MHz.

As depicted in FIG. 1, the regular preamble 104 in the mixed mode LPLR frame format 100 has a tone spacing of 312.5 kHz, while a different tone spacing may be used for the LPLR preamble 106 and LPLR data 108. Specifically, the tone spacing for the LPLR preamble 106 and LPLR data 108 may be 1/N of the tone spacing of the regular preamble 104, where N is a positive number. The mixed mode LPLR frame format 100 may be used as the frame format in 802.11ac, or 802.11n mixed mode.

The single mode LPLR frame format 102 includes an LPLR preamble 110 and LPLR data 112, which may be similar to the LPLR preamble 106 and the LPLR data 108 in the mixed mode LPLR frame format 100. Specifically, the tone spacing used in the single mode LPLR frame format 102 may be less than or equal to 312.5 kHz. The single mode LPLR frame format 100 may be used as the frame format in 802.11n Greenfield mode, in which an access point (AP) communicates only with 802.11n devices.

Figure 2:
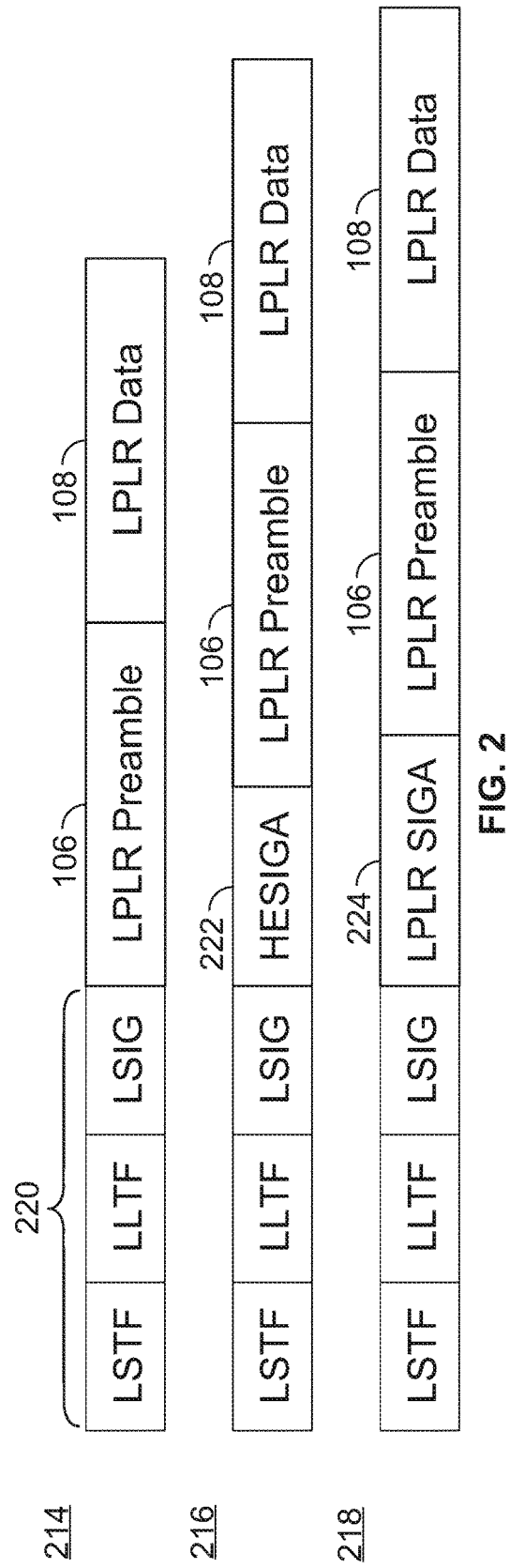
FIG. 2 is a diagram of three illustrative preamble formats for a mixed mode frame, in accordance with an embodiment of the present disclosure.

FIG. 2 is a diagram of three illustrative preamble formats for a mixed mode LPLR frame format, in accordance with an embodiment of the present disclosure. The first format 214 includes a regular preamble 220, followed by the LPLR preamble 106 and LPLR data 108 shown in FIG. 1. The regular preamble 220 includes information in the regular preamble 104. As depicted in FIG. 2, the regular preamble 220 of the first format 214 is a legacy preamble, which includes three fields: a legacy short training field (LSTF), a legacy long training field (LLTF), and a legacy signal (LSIG). The LSTF field may be used to detect a start of a data packet, while the LLTF field may be used for estimation of the channel or frequency offset as well as temporal synchronization. The LSIG field may include information related to data rate, data length, and parity data.

The second format 216 is similar to the first format 214, except that the preamble portion of the second format 216 additionally includes a HESIGA portion 222. Similar to the first format 214, the preamble portion of the second format 216 is followed by the LPLR preamble 106 and the LPLR data 108. The HESIGA portion 222 be used to protect the transmission of the mixed mode LPLR frame in the second format 216. Specifically, the HESIGA portion 222 may have a TxOP (transmission opportunity) duration, where TxOP refers to a scheme that enables a station to transmit multiple frames consecutively. Furthermore, the HESIGA portion 222 enables 802.11ax devices to defer properly, e.g., a device that is not intended for the transmission will not try to access the channel until a properly set delay. An 802.11n/ac device may be deferred using medium access control (MAC) signaling, which may not be accommodated by employing the transmission data format 214 alone.

The third format 218 is similar to the first format 214, except that the preamble portion of the third format 218 additionally includes an LPLR SIGA portion 224. Similar to the first format 214, the preamble portion of the third format 218 is followed by the LPLR preamble 106 and the LPLR data 108. The LPLR SIGA portion 224 may use a regular format of 312.5 kHz tone spacing.

In general, the regular preamble 104 for the mixed mode LPLR frame format 100 may include any of the preambles depicted in FIG. 2, and may include an LSTF field, an LLTF field, an LSIG field, and optionally a HESIGA field, an LPLR SIGA field, or both. In some implementations, the HESIGA and LRLR SIGA fields may be included in the same mixed mode preamble.

Figure 3:
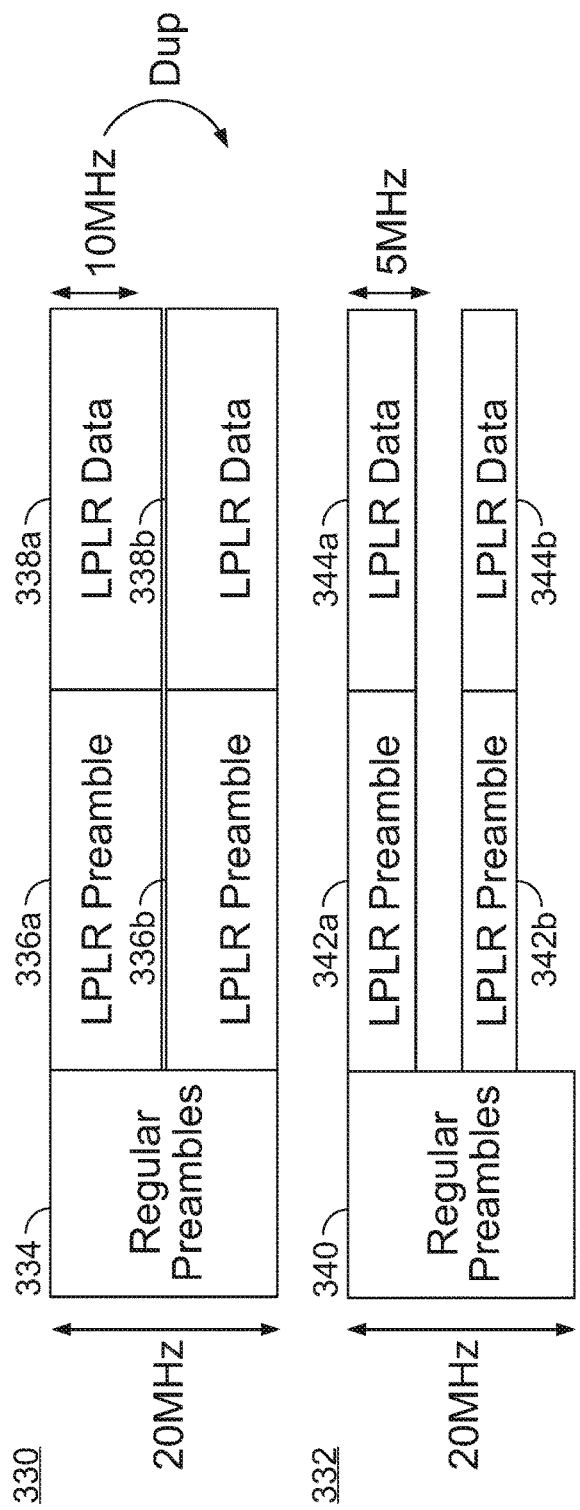
FIG. 3 is a diagram of two illustrative frame formats when a narrow band signal is duplicated, in accordance with an embodiment of the present disclosure.

FIG. 3 is a diagram of two illustrative frame formats when a narrow band signal is duplicated, in accordance with an embodiment of the present disclosure. In particular, the regular preamble 104 may occupy a 20 MHz bandwidth when a 64-point Fast Fourier Transform (FFT) is used. In some implementations, the LPLR format is set to occupy a bandwidth narrower than the regular preamble 104. This narrower bandwidth may be referred to herein as an LPLR bandwidth. The LPLR bandwidth may be 10 MHz, 5 MHz, 2 MHz, 1 MHz, or any other suitable bandwidth less than the bandwidth of the regular preamble 104.

A narrower bandwidth for the LPLR format (compared to the regular preamble 104) may be desirable because for the same amount of total power, a narrower bandwidth means that the power spectral density is increased. A higher power spectral density in a signal may be desirable because allows for the signal to be transmitted over longer distances without comprising signal quality. If the regular preamble 104 was forced to occupy a narrow bandwidth, then the throughput of the data would be compromised. However, a low data rate is not a disadvantage in the LPLR framework.

When the LPLR format occupies a bandwidth that is narrower than the bandwidth that the regular preamble 104 occupies, the LPLR format may be duplicated in the frequency domain to occupy the full bandwidth of the regular preamble. As is depicted in FIG. 3, the frame format 330 includes a 20 MHz regular preamble 334 and a 10 MHz LPLR format (including a first LPLR preamble 336a and first LPLR data 338a), which occupies only half of the bandwidth of the regular preamble. The LPLR format is duplicated to form the second LPLR preamble 336b and the second LPLR data 338b, which are copies of the first LPLR preamble 336a and the first LPLR data 338a, respectively. As is shown in the frame format 330, the LPLR format signal is duplicated to occupy the full bandwidth of 20 MHz.

Duplicating the LPLR format signal to occupy the full bandwidth of 20 MHz means that the power spectral density of the signal is unchanged. However, the duplication provides an improvement in signal-to-noise ratio (SNR) because the LPLR format is transmitted multiple times, causing the noise in the transmission to be reduced by a factor of N, where N is the number of duplicates of the LPLR format.

In some embodiments, the duplication depicted in FIG. 3 is straightforward duplication, such that the duplicates are exact copies of each other. In other embodiments, the duplication may be performed in a manner that further improve the signal transmission. In one example, duplication may occur after a phase rotation, such that the first LPLR preamble 336a and first LPLR data 338a are out of phase relative to the second LPLR preamble 336b and the second LPLR data 338b. Combining the out-of-phase LPLR formats provides improvement in the SNR by reducing the peak-to-average power (PAPR). In some embodiments, duplication involves additional scrambling or permutation in the bit or symbol domain to provide further diversity or flexibility.

In the frame format 330, the LPLR format occupies 10 MHz. In general, the LPLR format may occupy a bandwidth that is 1/N of the bandwidth of the regular preamble 334. For example, the LPLR format may occupy a bandwidth of 5 MHz (N=4), and may be duplicated 4 times to occupy the full 20 MHz bandwidth. As another example, the LPLR format may occupy a bandwidth of 2 MHz (N=10), and may be duplicated 10 times to occupy the full 20 MHz bandwidth. In general, when the LPLR format occupies a bandwidth of 20/N MHz, the LPLR format may be duplicated N times to occupy the full 20 MHz bandwidth.

In some implementations, the LPLR format is duplicated in the frequency domain to occupy less than the full bandwidth of the regular preamble. The frame format 332 includes a 20 MHz regular preamble 340 and a 5 MHz LPLR format (including a first LPLR preamble 342a and first LPLR data 344a), which occupies only one fourth of the bandwidth of the regular preamble 340. The LPLR format is duplicated to form the second LPLR preamble 342b and the second LPLR data 344b, which are copies of the first LPLR preamble 342a and the first LPLR data 344a, respectively.

As is shown in the frame format 332, the LPLR format signal is duplicated to occupy only half of the full bandwidth of 20 MHz. In particular, the first LPLR format occupies a first quarter of the 20 MHz band (e.g., 0 to 5 MHz), and the duplicate LPLR format occupies a third quarter of the 20 MHz band (e.g., 10 to 15 MHz). A frequency gap may be used between duplicates in order to decrease an amount of interference between adjacent duplicates. Rather than occupying the full 20 MHz, only occupying half of the band as shown in the frame format 332 has an advantage of reducing noise by a factor of 2, while improving the power spectral density by a factor of 2 and gaining diversity.

The example frame formats 330 and 332 are shown by way of illustrative example only. In general, the number and/or locations of the duplicates may be fixed, dynamic according to PHY header signaling, or semi-static according to control/management frames.

Figure 4:
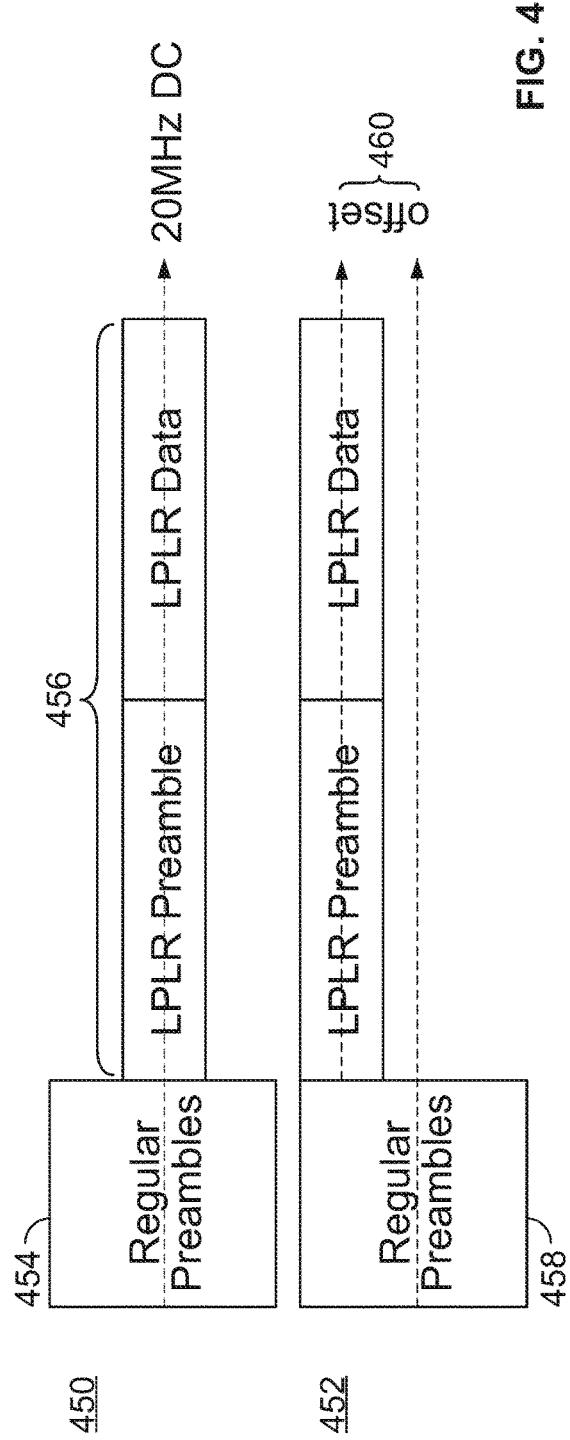
FIG. 4 is a diagram of two illustrative frame formats when a narrow band signal is offset, in accordance with an embodiment of the present disclosure.

FIG. 4 is a diagram of two illustrative frame formats 450 and 452 when a narrow band LPLR format 456 is offset, in accordance with an embodiment of the present disclosure. In particular, the LPLR formats 456 depicted in FIG. 4 occupy a narrower bandwidth than the bandwidth of the regular preamble (e.g., the regular preamble 454 of the frame format 450 and the regular preamble 458 of the frame format 452). However, unlike the examples described in relation to FIG. 3, the LPLR formats 456 are not duplicated in FIG. 4. Instead, the LPLR formats 456 may be offset to occupy different narrow bands within the bandwidth of the regular preamble.

In an example, the LPLR format 450 includes a regular preamble 454 and an LPLR format 456 that occupies a bandwidth that is centered around the center of the band of the regular preamble 454. In another example, the LPLR format 452 includes a regular preamble 458 and an LPLR format 456 that is offset from the center of the band by a frequency offset 460.

The frequency offset 460 may be fixed or dynamic. If the frequency offset 460 is dynamic, the frequency offset 460 may be updated after a certain time period with or without signaling. In one example, signaling may be performed according to a current PHY header or an earlier PHY header, or by control/management frames. The signaling allows for a determination that a change to the frequency offset 460 will occur. Alternatively, signaling may not be required. In one example, a device may have no information regarding the frequency offset, and so performs a blind search. After the device identifies the frequency offset 460, the device becomes phase locked to the appropriate period, and does not need signaling to remain synchronized with changes that occur in the frequency offset 460. This blind search may be performed when the device is initially turned on, or woken from a sleep state. In this case, signaling may not be required when the change to the frequency offset 460 is fixed or predetermined.

Figures 5, 6, 7:
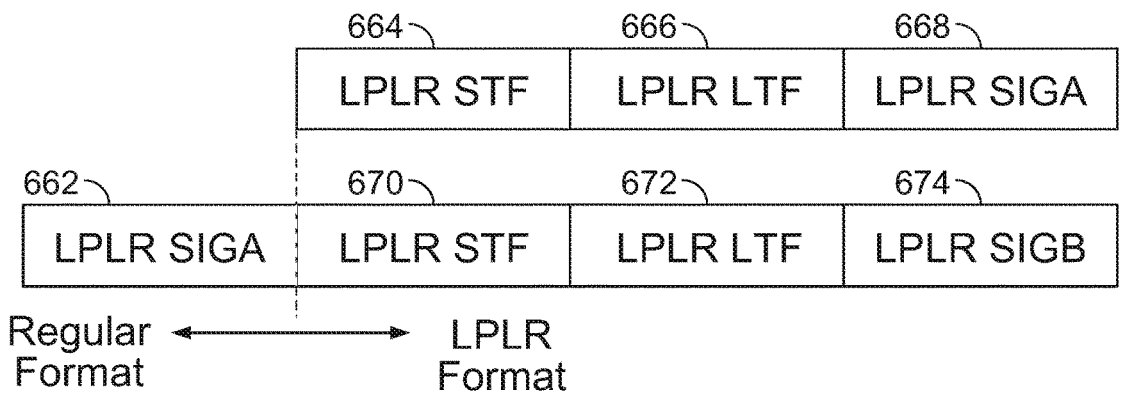
FIG. 5 is a table of six example LPLR format signals and their parameters, in accordance with an embodiment of the present disclosure.
FIG. 6 is a diagram of a preamble structure of an LPLR frame, in accordance with an embodiment of the present disclosure.
FIG. 7 is a table of five example LPLR format signals and their parameters when the LPLR bandwidth is 5 MHz, in accordance with an embodiment of the present disclosure.

FIG. 5 is a table of six example LPLR format signals, their parameters, and corresponding tone plans that may be used with these signals, in accordance with an embodiment of the present disclosure. In each example, a tone plan may involve reusing an existing tone plan, or a new tone plan may be defined. In a first example, the LPLR bandwidth is 10 MHz for a 64-point FFT with a tone spacing of 156.25 kHz. This first example may be used in accordance with the existing 11a or 11ac tone plan with 20 MHz. In a second example, the LPLR bandwidth is 10 MHz for a 32-point FFT with a tone spacing of 312.5 kHz. This second example may be used in accordance with the existing 11ah tone plan with 1 MHz. In a third example, the LPLR bandwidth is 5 MHz for a 64-point FFT with a tone spacing of 78.125 kHz. This third example may be used in accordance with the existing 11a or 11ac tone plan with 20 MHz. In a fourth example, the LPLR bandwidth is 5 MHz for a 32-point FFT with a tone spacing of 156.25 kHz. This fourth example may be used in accordance with the existing 11ah tone plan with 1 MHz. In a fifth example, the LPLR bandwidth is 2 MHz for a 64-point FFT with a tone spacing of 31.25 kHz. This fifth example may be used in accordance with the existing 11a or 11ac tone plan with 20 MHz. In a sixth example, the LPLR bandwidth is 2 MHz for a 32-point FFT with a tone spacing of 62.5 kHz. This sixth example may be used in accordance with the existing 11ah tone plan with 1 MHz. For example, the tone plan indicates how many and which tones are to be populated, and which tones are for data and which are for pilot. The 802.11 system have example multiple tone plans available for different bandwidths and systems. For example, "11ah 1 MHz" is the 802.11ah system operating in 1 MHz. The corresponding tone plan can be reused when LRLP BW=10 MHz and FFT is 32-point. Whether to reuse a tone plan generally depends on the FFT size.

FIG. 6 is a diagram of various LPLR preamble structures of an LPLR frame, in accordance with an embodiment of the present disclosure. The LPLR preamble structure shown in FIG. 6 may be used for any of the LPLR preambles described herein, including LPLR preamble 106, 110, 336, and 342, or within the LPLR format 456. As depicted in the top example of FIG. 6, the LPLR preamble structure includes an LPLR short training field (STF) 664, an LPLR long training field (LTF) 666, and an LPLR signaling field (LPLR SIGA 668), all of which are in the LPLR format of the LPLR frame. In the bottom example of FIG. 6, the LPLR preamble structure includes an LPLR SIGA field 662 in the regular format, followed by an LPLR STF 670, an LPLR LTF 672, and an LPLR SIGB field 674 in the LPLR format of the LPLR frame. Either the top example or the bottom example may be used for the LPLR preamble structure.

In some implementations, format of the LPLR preamble structure switches dynamically between the top and bottom examples of FIG. 6. The switch may occur via detection, by signaling in the PHY header, by signaling in the control/management frame, by frame type/deployment, or by other implicit signaling.

The LPLR STF fields 664 and 670 and the manner in which the LPLR STF is detected and used are next described in detail in relation to FIG. 7. The use and detection of the LPLR STF may depend on the location of a particular device relative to a WIFI network, and may depend on whether the mixed mode LPLR frame format 100 or the single mode LPLR frame format 102 are used.

In one example, some devices are positioned further away from a WIFI network, and thus are unable to use LSTF to sense the carrier. For these faraway devices, the LPLR STF may be used for carrier sensing, coarse carrier frequency offset correction, correction of symbol timing, setting of an automatic gain control (AGC), or any suitable combination thereof.

In another example, devices that are positioned within a regular WIFI zone are able to sense the carrier by LSTF. For these closer devices, the LPLR STF may be used for auto-detection of an LPLR frame. In this case, when the mixed mode LPLR frame format 100 is used, the device first detects the LSTF field. Then, after receiving a number of symbols, the device may attempt to detect LPLR STF, regardless of whether the LSIG is decoded correctly or not. If LPLR STF is detected, then the LPLR frame format is detected in the mixed mode 100. Other autodetection methods may be used together with LPLR STF detection.

Alternatively, for devices positioned within a regular WIFI zone, if LSTF is not detected, these devices may be configured to still attempt to search for an LPLR STF field. If LPLR STF is detected without having detected LSTF, then the LPLR frame format is detected in the single mode 102. In some embodiments, a device has two parallel tracks. A first track is configured to detect the presence of LSTF, and a second track is configured to detect the presence of LPLR STF. Depending on which track is able to detect an incoming data packet, or whether both tracks are able to detect an incoming data packet, then the specific frame format of the data packet may be determined (e.g., whether the format is in the mixed mode 100 or single mode 102).

In some implementations, the LPLR STF field reuses LSTF periodic signaling in the time domain, but with different parameters from the LSTF parameters. In particular, the LPLR STF field is periodic in the time domain, with L periods and each period having length T. In the frequency domain, the LPLR STF field occupies K tones. In other words, the LPLR STF transmits non-zero signals every K tones in frequency. For example, for an LPLR bandwidth having a tone spacing of $\Delta f_{LPLR}$, each period may be written as:

$$T = \frac{1}{\Delta f_{LPLR} \cdot K} = \frac{N_{FFT}}{BW_{LPLR} \cdot K}$$

where $BW_{LPLR}$ corresponds to the LPLR bandwidth, and $N_{FFT}$ corresponds to the length of the FFT. For example, in LSTF, if the number of tones K=4, a different K (e.g. 8, 16, etc.) can be used for LPLR STF.

FIG. 7 is a table of five example sets of parameters for an LPLR STF signal when the LPLR bandwidth is 5 MHz, in accordance with an embodiment of the present disclosure. In a first example, the FFT has length 64, tone spacing is 78.125 kHz, K is 4, T is 3.2 us, and L is at least 5. In a second example, the FFT has length 64, tone spacing is 78.125 kHz, K is 8, T is 1.6 us, and L is at least 5. In a third example, the FFT has length 64, tone spacing is 78.125 kHz, K is 16, T is 0.8 us, and L is at least 5. In a fourth example, the FFT has length 32, tone spacing is 156.25 kHz, K is 4, T is 1.6 us, and L is at least 5. In a fifth example, the FFT has length 32, tone spacing is 156.25 kHz, K is 8, T is 0.8 us, and L is at least 5. In general, any suitable combination of parameters may be used for LPLR STF that is in accordance with the equation above.

In some implementations, the LPLR STF is adaptive in one or more parameters. In particular, the duration of LPLR STF may be fixed or dynamic. For example, the LPLR STF duration may be fixed when the number of periods L is fixed, and may be dynamic when L is adaptive. By allowing the LPLR STF duration to change dynamically, efficiency and coverage may be improved. In particular, a shorter LPLR STF duration costs less in overhead, but a device may have fewer periods to perform carrier sensing and carrier frequency offset estimation. Conversely, a longer STF duration improves coverage but at the expense of system efficiency.

When the LPLR STF is adaptive, the dynamic change may be performed without signaling, such that the device may perform blind detection to detect the change to the LPLR STF duration. Alternatively, signaling may be performed in the control/management frame. Or signaling can be reflected in the PHY header. In some implementations, the duration of the LPLR STF may be forced to be at least as long as a minimum duration that is known to all the devices, such as 5 periods in the examples depicted in FIG. 7.

In some implementations, an AP may change the duration of the LPLR STF under any one or more of the following conditions: (1) after transmitting a control/management frame, (2) periodically changing the duration with an adjustable window, (3) occasionally changing the duration to help faraway devices to establish connection, and (4) changing the LPLR STF duration based on the type of frame (e.g., a beacon frame may be sent with a longer LPLR STF duration than a frame without a beacon).

In some implementations, downlink frames may use different LPLR STF parameters than uplink frames. In particular, uplink transmissions may have lower transmit power than downlink transmissions, such that a longer LPLR STF duration for uplink transmissions may be desirable to compensate for this UL/DL power offset. In an example, an AP may transmit the downlink frame using an LPLR STF of $K_{DL}$ tone sampling with $N_{DL}$ periods, while a station may transmit the uplink frame using an LPLR STF of $K_{UL}$ tone sampling with $N_{UL}$ periods. The parameters $N_{DL}$, $N_{UL}$, $K_{UL}$ and $K_{DL}$ may be arbitrarily set. The station may select an LPLR STF parameter based on an indication provided by the AP, a decision made by the station, or a combination of both.

Figure 8:
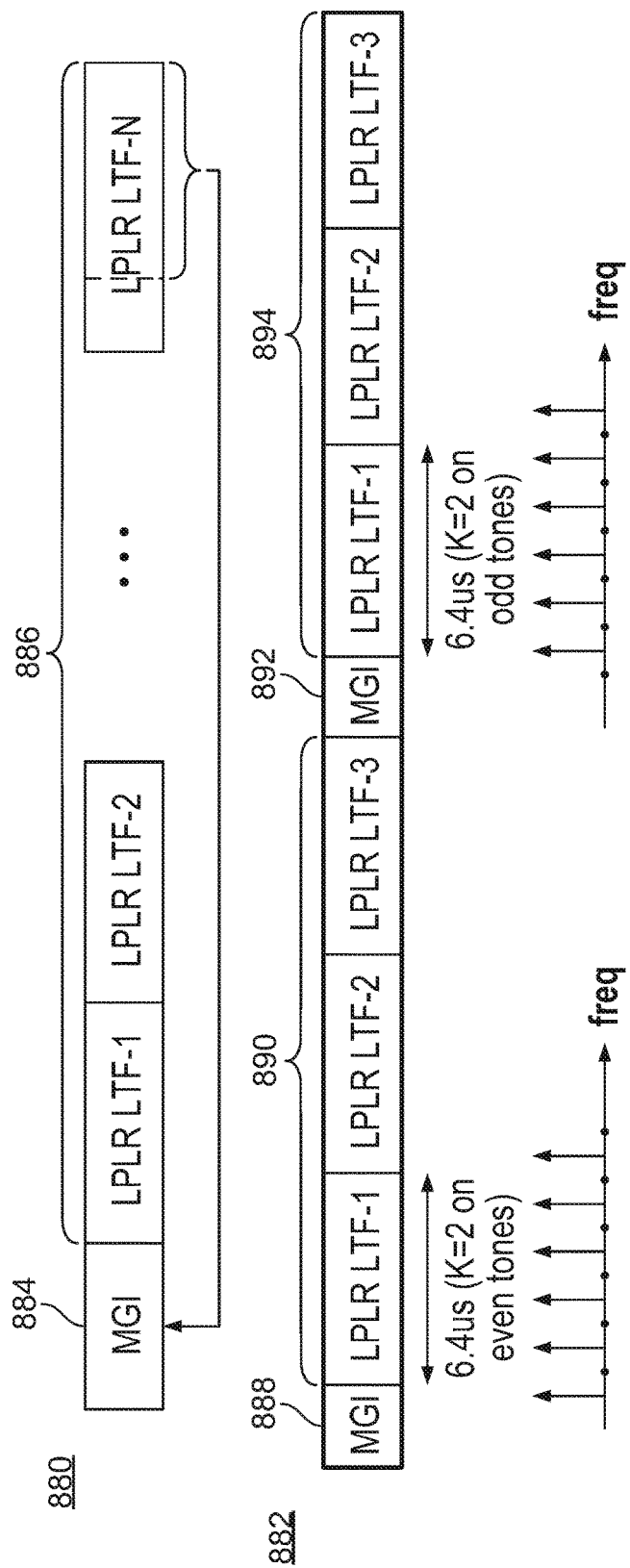
FIG. 8 is a diagram of two illustrative LPLR frame transmissions when multiple copies of the LPLR LTF are transmitted, in accordance with an embodiment of the present disclosure.

The LPLR LTF fields 666 and 672 are next described in detail in relation to FIG. 8, which is a diagram of two illustrative LPLR frame transmissions when multiple copies of the LPLR LTF field are transmitted, in accordance with an embodiment of the present disclosure.

In some implementations, the LPLR LTF is able to provide channel estimation for faraway devices that may have up to 5-10 dB worse SNR tolerance than other WLAN devices. To improve the gain, the LPLR LTF field may be duplicated multiple times in the time domain to improve SNR. The LPLR LTF field may need to be configured to handle a channel with a long delay spread. For a narrower bandwidth for LPLR signals and smaller tone spacing, the frequency correlation between adjacent subcarriers may be higher. To remedy this, the LPLR LTF field may be downsampled to reduce overhead. In other words, down-sampling causes the LPLR LTF to be shorter in duration, which leads to less work required to process the LPLR LTF. Moreover, a shorter LPLR LTF duration may also help with correction of a fine carrier frequency offset.

In FIG. 8, two exemplary LPLR frame transmissions are depicted. In a first example transmission 880, MGI 884 refers to an M-times long guard interval (GI), which is a time interval to ensure that distinct transmissions do not interfere with each other in the time domain, and may be longer than a regular GI. The MGI 884 is M times longer than the GI used in the later data portions, where M is a positive number greater than one (and may not be an integer). In the transmission 880, N replicates 886 of the LPLR LTF are transmitted, where M and N may be the same or different. Moreover, after the N-th replicate of the LPLR LTF is transmitted, another MGI 884 is repeated before another N concatenated replicates of an LPLR LTF. In this respective example, 886 refers to N replicates of the same LPLR LTF field. After the N-th LPLR LTF and 880 returns to the MGI, the next set of N LPLR LTFs may be processed in a similar manner. In an example, M=2 and N=3, but in general, M and N may be any suitable positive integer. When M is greater than one, the MGI 884 of the transmission 880 is longer than a regular GI. Having a longer MGI interval 884 may be beneficial when the length of the channel is unknown or when only the rough timing of the channel is known. In this case, the longer MGI 884 provides flexibility between symbols, so that the device may accurately identify the timing of the symbols within the LPLR LTF replicates 886.

In some implementations, the LPLR LTF is compressed. Each LPLR LTF signal in the frequency domain may only include non-zero values every K tones. This means that effectively, the LPLR LTF signal in the time domain is periodic with K periods in one FFT window. In this case, the device may transmit N LPLR LTF periods in the time domain, where N may be larger or smaller than K. In an example, a system may use an LPLR bandwidth of 5 MHz and a 64-point FFT. When M=2, N=3, and K=2, each period $T_{LTF}$ of the LPLR LTF signal is 6.4 us. If the GI for the data is 0.8 us and the LTF is repeated for 3 periods, then the length of the LPLR LTF symbol may be computed as 0.8*2+6.4*3=20.8 us, or M*GI+$T_{LTF}$*N.

In a second example transmission 882, the transmission 882 begins with a first MGI 888, followed by a first set of three copies of LPLR LTF 890, a second MGI 892, and a second set of three copies of LPLR LTF 894. As depicted in the transmission 882, multiple MGI LPLR LTF symbols may be used. Each LTF symbol may be compressed with the same or different sampling rate and/or duration. As shown in FIG. 8, the first set 890 and the second set 894 of the copies of LPLR LTF are offset in frequency. In this case, N=3. Assuming that M=2, two LPLR LTF symbols are transmitted in the transmission 882. The first LPLR LTF symbol (in the first set 890) uses K=2 on each even tone with 3 repetitions, and the second LTF symbol (in the second set 894) uses K=2 on each odd tone with 3 repetitions. Such offset frequency sampling as shown in the transmission 882 may be used to avoid the need to perform channel interpolation.

In some implementations, the LPLR LTF fields 890 and 894 are downsampled. In particular, devices that use LPLR frames (e.g., transmit and receive data formatted in LPLR frames) have a low cost. The LPLR LTF field may be used to finetune the CFO detection and symbol timing. One problem associated with this is that with the narrow tone spacing associated with LPLR frame formats, the length of the signal is long in the time domain. When the duration of the LPLR LTF field is too long, the phase difference may be greater than 2π, which leads to ambiguity in performing the fine-tuning. Accordingly, downsampling may be performed such that the LPLR LTF field is restricted to have a short duration to avoid such ambiguities.

Figure 9:
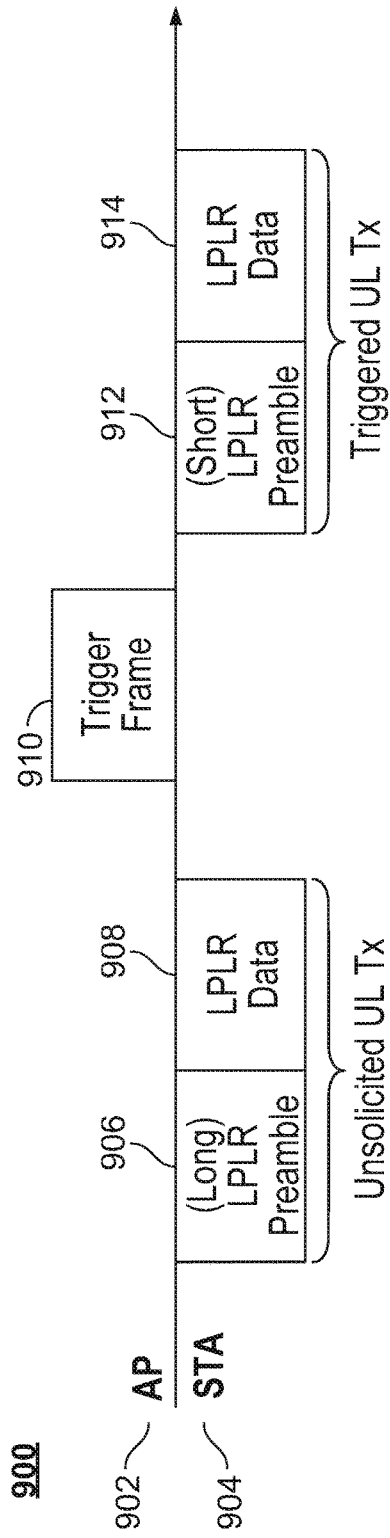
FIG. 9 is a diagram of uplink and downlink transmissions of LPLR data, in accordance with an embodiment of the present disclosure.

FIG. 9 is a diagram 900 of uplink and downlink transmissions of LPLR data, in accordance with an embodiment of the present disclosure. In particular, a base station 904 communicates uplink transmissions to an AP 902, which communicates downlink transmissions back down to the base station 904. When LPLR data is transmitted between the base station 904 and the AP 902, the LPLR STF field may be adaptive, based on whether an uplink transmission is solicited or unsolicited by the AP 902.

As is shown on the left side of the diagram 900, a long LPLR preamble 906 followed by LPLR data 908 form an unsolicited uplink transmission. This uplink transmission is unsolicited because there is no trigger message. In this case, a long LPLR preamble is used to allow the AP 902 more time to process the incoming frame and detect the LPLR format.

The right side of the diagram 900 shows a trigger frame 910 initiated by the AP 902 to the base station 904, followed by a triggered uplink transmission from the base station 904 that includes a short LPLR preamble 912 and LPLR data 914. Because this uplink transmission was transmitted in response to receiving the trigger frame 910, a shorter preamble format in the LPLR preamble 912 may be used because the AP 902 then expects to receive data in the LPLR format. In some implementations, the format of the preamble 912 is fixed (e.g., determined by the base station 904 in advance), or may be set according to information in the trigger frame 910.

Figure 10:
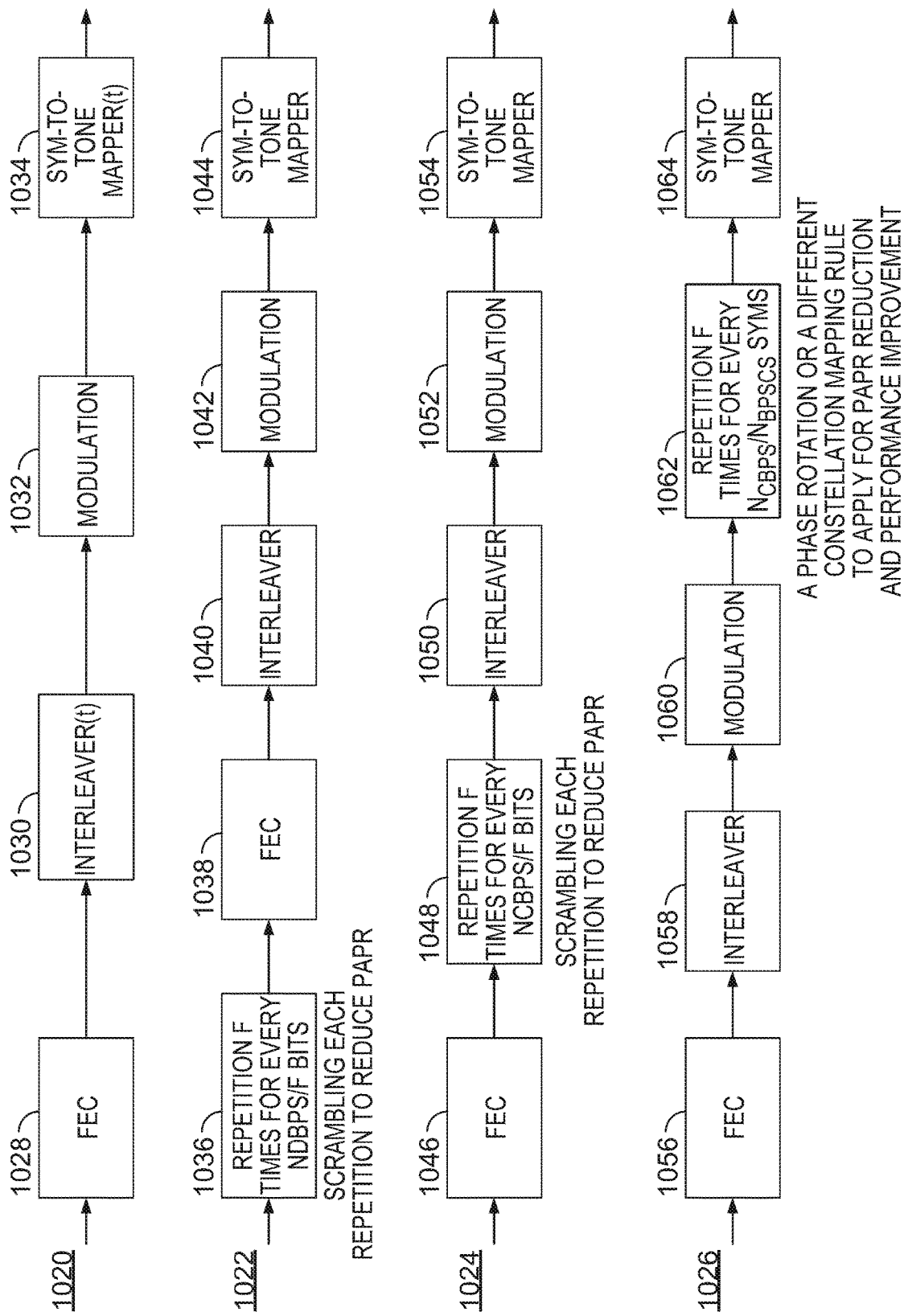
FIG. 10 depicts four illustrative block diagrams of processing LPLR data, including LPLR SIG repetition in time and LPLR SIG repetition in frequency, in accordance with an embodiment of the present disclosure.

The LPLR SIG fields 224, 662, 668, and 674 are next described in detail in relation to FIG. 10, which depicts four illustrative block diagrams of processing LPLR data, including LPLR SIG repetition in time and LPLR SIG repetition in frequency, in accordance with an embodiment of the present disclosure. Specifically, the LPLR SIG field may use FFT sizes and tone plans as described above. The modulation coding scheme (MCS) for the LPLR SIG field may be fixed or selected from a set of different MCS's and signaled. The signaling may be performed explicitly in regular PHY headers, implicitly in LSTF, LLTF, LPLR STF, LPLR LTF, or any suitable combination thereof, or in the control/management frames. In some implementations, the LPLR SIG field is encoded by Bitwise Balanced enCoding (BBC), tail-biting BCC (TBCC), or low density parity check (LDPC) encoding. As is described in detail below, the LPLR SIG field may be repeated in time (e.g., as is described in relation to diagram 1020) or in frequency (e.g., as is described in relation to diagrams 1022, 1024, and 1026), or a combination of both time and frequency.

In a first diagram 1020, the LPLR SIG field is repeated in time with diversity to improve reliability. Examples of this time repetition is described in relation to U.S. patent application Ser. No. 14/618,692, which is incorporated herein by reference in its entirety. In particular, each LPLR symbol may be repeated T times, where each repeated symbol may have a different bit or symbol mapping. For the t-th repetition (where t=1 . . . T), the encoding procedure may involve the structure in the diagram 1020, which includes a forward error correction (FEC) block 1028, an interleaver 1030, a modulation block 1032, and a symbol-to-tone mapper 1034. In the first diagram 1020, the interleaver 1030 and the symbol-to-tone mapper 1034 are dependent on t, such that the interleaving and the symbol-to-tone mapping may be different for different repetitions, as is described in detail below.

In some implementations, the interleaver 1030 varies in time, and is dependent on t. In particular, if BCC or TBCC are used, the interleaver 1030 may be shifted for each repetition, according to:

$$i = \frac{N_{CBPS}}{N_{col}} \cdot ((k + \Delta(t)) \bmod N_{col}) + \left\lfloor \frac{k + \Delta(t)}{N_{col}} \right\rfloor$$

where i is the index of output bits from the interleaver; k is the index of input bits; $\Delta(t)$ corresponds to an offset for the t-th repetition; $N_{col}$ denotes the number of columns of the interleaver; and $N_{CBPS}$ denotes the coded bits per orthogonal frequency-division multiplexing (OFDM) symbol.

In some implementations, the symbol-to-tone mapper 1034 varies in time, and is dependent on t. In particular, the symbol-to-tone mapper 1034 may be updated for each repetition:

$$i = (k + \Delta(t)) \bmod N_{SD}$$

where k is the index of symbols input to the symbol-to-tone mapper 1034, i is the index of tones, $\Delta(t)$ corresponds to an offset for the t-th repetition, and $N_{SD}$ is the total number of data tones.

The block diagrams 1022, 1024, and 1026 each illustrate repetition of the LPLR SIG field in frequency, but each diagram illustrates the frequency repetition as occurring at a different time within a sequence of functional blocks. Each of the diagrams 1022, 1024, and 1026 include an FEC block, an interleaver, a modulation block, and a symbol-to-tone mapper in the same order as shown in the block diagram 1020, except that the frequency repetition is performed at a different position. In general, the LPLR SIG field may be repeated in the frequency domain in a manner similar to MCS10 in 802.11ah, and is repeated in the frequency domain to form F repetitions.

In the second diagram 1022, the repetition block 1036 occurs before the FEC block 1038, which is followed by the interleaver 1040, the modulation block 1042, and the symbol-to-tone mapper 1044. The repetition block 1036 generates F repetitions in the frequency domain for every $N_{DBPS}/F$ bits, wherein $N_{DBPS}$ denotes the number of data bits per OFDM symbol, and scrambling may be done for each repetition in order to reduce PAPR.

In the third diagram 1024, the repetition block 1048 follows the FEC block 1046, and is followed by the interleaver 1050, the modulation block 1052, and the symbol-to-tone mapper 1054. Similar to the repetition block 1036, the repetition block 1048 generates F repetitions in the frequency domain for every NDBPS/F bits, and scrambling may be done for each repetition in order to reduce PAPR.

In the fourth diagram 1026, the repetition block 1062 occurs after the FEC block 1056, the interleaver 1058, and the modulation block 1060, and is followed by the symbol-to-tone mapper 1064. The repetition block 1062 generates F repetitions in the frequency domain for every $N_{CBPS}/N_{BPSCS}$ symbols, wherein $N_{BPSCS}$ denotes the number of bits per subcarrier and stream, and $N_{DBPS} = N_{CBPS} \times \text{coding-rate}$. Moreover, to reduce PAPR and improve performance, different phase rotation, or a different constellation mapping may be applied for each repetition. Specifically, in 1026, phase rotation or constellation mapping is used to reduce PAPR in the bit domain, and scrambling is used in 1022 and 1024 to reduce PAPR in the symbol domain.

In some implementations, the LPLR SIG field is repeated in both the time domain as well as the frequency domain. Time and frequency repetition may be signaled on top of MCS, or at a new MCS level. The new MCS level can be defined with respect to the repetition scheme, which may be at an effectively lower rate.

In some implementations, a device is capable of automatically detecting the LPLR frame format. In an example, a device may sense the carrier via LSTF or LPLR STF, and classifies the frame as an LPLR frame or a non-LPLR frame. LPLR frames may be classified according to one or more characteristics of the LPLR STF, LPLR LTF, and LPLR SIG fields (or other fields) as described herein, or any combination of these fields. In some implementations, one field (e.g., the LPLR STF field) alone may not provide enough information to perform the autodetection. In this case, the one or more other fields (e.g., the LPLR LTF field) may be reviewed to detect the LPLR frame format.

The autodetection may be performed based at least in part on the LPLR STF field. In a first example, the LPLR STF signal itself may be used as a signature. In this case, the LPLR STF uses a different sequence than the LSTF, and is therefore used as a signature to indicate that an LPLR format is present. In a second example, the LPLR STF has a time signature. In this case, the LPLR STF signal may have a different number of periods and/or a different duration for each LPLR STF period. Specifically, a longer LPLR STF signal may lead to a longer autocorrelation falling edge delay relative to a CS rising edge, as autocorrelation may take a longer time to settle for a longer sequence. In a third example, the LPLR STF has a frequency signature. In this case, a longer LPLR STF may be used after the AGC has settled, and a set of the LPLR STF periods may be converted into the frequency domain to identify the frequency domain pattern. The LPLR STF frequency signature may have particular characteristics, such as a bandwidth less than 20 MHz, bandwidth hopping or repetition, and tone spacing or tone sampling, or any suitable combination thereof. These three examples are provided as illustrative methods for performing autodetection based on the LPLR STF field, and may be combined with one another or other methods of autodetection described herein.

The autodetection may be performed based at least in part on the LPLR LTF field. In a first example, the LPLR LTF sequence is masked by a predefined sequence (such as the masking that is done in for 802.11ah LTF1, for example)), or includes a sequence defined differently from the LLTF field. In a second example, the LPLR LTF field is QBPSK modulated, which corresponds to QPSK modulation but rotated 90 degrees. In this case, when multiple LPLR LTF symbols are transmitted, the first symbol, a subset of the symbols, or all the symbols may be QBPSK modulated. In a third example, the LPLR LTF repetition is performed in a different manner than the LLTF is repeated, and the repetition forms a signature. In this case, a different GI or a different repetition of the LPLR LTF sequences may be used. Additionally or alternatively, multiple LPLR LTF symbols may be used to reflect the signature. In a fourth example, the LPLR LTF has a frequency pattern that forms its signature. In this case, the signature may involve a bandwidth of the LPLR LTF field that is less than 20 MHz, or the LPLR LTF field may have a specific frequency hopping or repetition pattern, tone sampling pattern for compressed LPLR LTF, or a different tone sampling over multiple LPLR LTF symbols. These four examples are provided as illustrative methods for performing autodetection based on the LPLR LTF field, and may be combined with one another or other methods of autodetection described herein.

Figure 11:
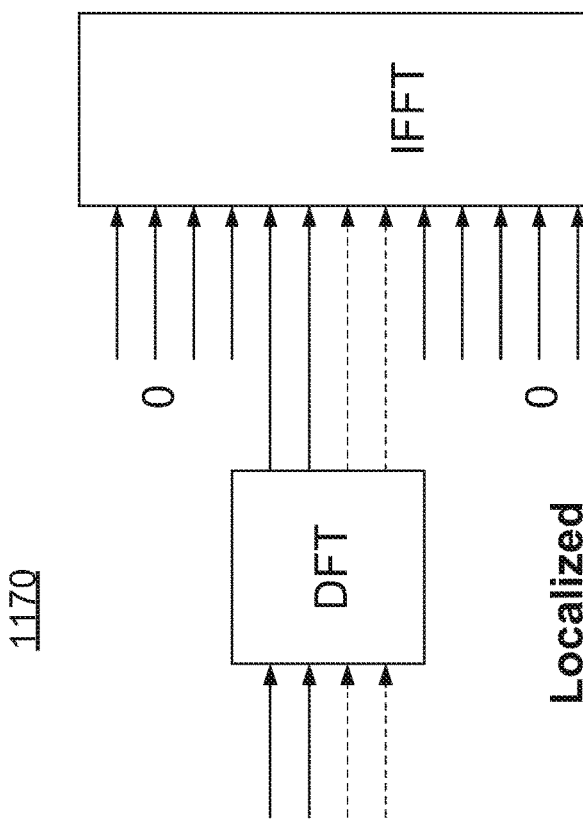
FIG. 11 is a diagram of an illustrative block diagram of localized and distributed processing, in accordance with an embodiment of the present disclosure.
Figure 11:
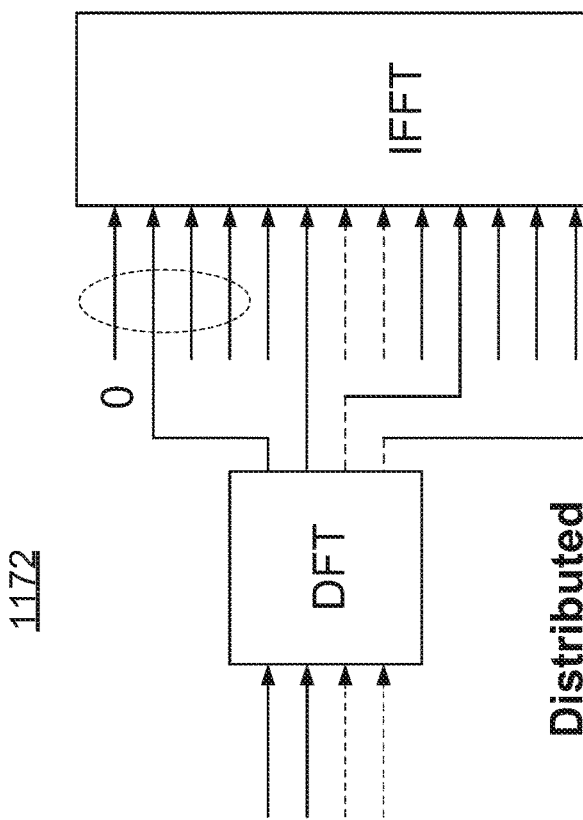

FIG. 11 is a diagram of an illustrative block diagram of localized and distributed processing, in accordance with an embodiment of the present disclosure. In particular, the data in an LPLR frame may use a specific modulation scheme such as orthogonal frequency-division multiplexing (OFDM) or single-carrier (SC) transmission. SC transmission may be beneficial to reduce PAPR. When SC transmission is used, the transmission may be localized, as is shown in the diagram 1170 of FIG. 11, and consecutive tone mapping may be performed at the output of the DFT block. In this case, the tones that are mapped at the output of the DFT may be static, dynamic (e.g., signaled by the LPLR SIG field), or semi-static (e.g., signaled by management/control frames). Alternatively, when SC transmission is used, the transmission may be distributed, as is shown in the diagram 1172 of FIG. 11, and non-consecutive tone mapping may be performed at the output of the DFT block. Similar to the localized example, the tones used in the distributed example may be static, dynamic, or semi-static.

In some implementations, the modulation schemes described in relation to FIG. 11 are used in a hybrid approach. In a first example, a downlink LPLR frame uses OFDM, while uplink LPLR frames use SC transmission. In a second example, uplink LPLR trigger-based frames use SC modulation, while the rest of the frames use OFDM. In a third example, uplink LPLR trigger-based frames use the modulation schemes that are signaled by the trigger frames. In a fourth example, the modulation scheme used in an LPLR frame is signaled in a preamble for the receiver to detect.

Figure 12:
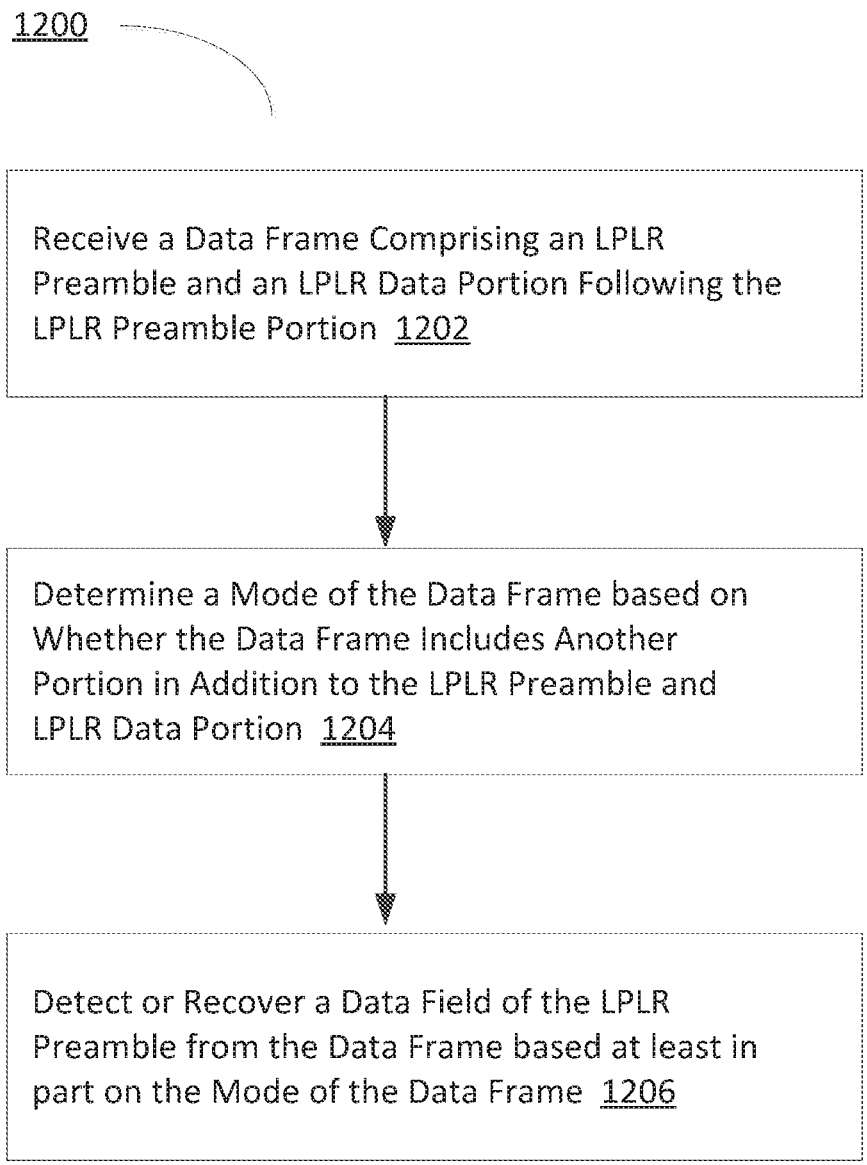
FIG. 12 is a high level flow chart for a process for detecting data in an LPLR format, in accordance with an embodiment of the present disclosure.

FIG. 12 shows a high level flow chart for a process 1200 for detecting data received in an LPLR data frame format, in accordance with an embodiment of the present disclosure.

At 1202, the process 1200 includes receiving, e.g., at a wireless receiver, a data frame comprising an LPLR preamble portion and an LPLR data portion following the LPLR preamble portion. The structure of the data frame may be configured (e.g., at a wireless transceiver where the data frame was prepared to be transmitted) such that the LPLR preamble portion and the LPLR data portion may occupy a bandwidth that is less than an allowed bandwidth. At 1204, the mode of the data frame may be determined (e.g., by processing or control circuitry at the wireless receiver, or a computing device communicatively coupled to the wireless receiver) based on whether the data frame includes another portion in addition to the LPLR preamble portion and the LPLR data portion. For example, as is described in relation to FIG. 1, the LPLR data frame format may be in a mixed mode or in a single mode. In the mixed mode 100, the LPLR data frame format additionally includes a legacy preamble (e.g., a regular preamble 104) that precedes the LPLR preamble portion and occupies the full allowed bandwidth (e.g., 20 MHz). In the single mode 102, the legacy preamble is not included in the data frame format.

As is described in relation to FIGS. 1 and 3-5, the allowed bandwidth may be 20 MHz, and the first bandwidth may be less than 20 MHz. Moreover, the LPLR preamble portion and the LPLR data portion may be set at a frequency offset (as described in relation to FIG. 4), where the value of the frequency offset may be signaled or not signaled. The LPLR preamble portion and the LPLR data portion may be duplicated in the frequency domain (as described in relation to FIG. 3), where the duplicates may occupy the full allowed bandwidth (e.g., 20 MHz) or less than the full allowed bandwidth. When the LPLR preamble and LPLR data are duplicated to occupy less than the full allowed bandwidth, a frequency gap may separate adjacent duplicates to reduce interference.

The LPLR preamble portion includes an LPLR STF field, an LPLR LTF field, and an LPLR SIG field. At 1206, any of such fields may be detected or recovered (e.g., by processing or control circuitry at the wireless receiver, or a computing device communicatively coupled to the wireless receiver) from the received data frame. For example, as is described above in relation to FIG. 7, the use and detection of the LPLR STF may depend on the location of a particular device relative to a WIFI network, and may depend on whether the mixed mode LPLR frame format 100 or the single mode LPLR frame format 102 are used. As is described above in relation to FIG. 8, the LPLR LTF field may be replicated multiple (N) times in the time domain, and preceded by a time interval that is M times a length of a regular guard interval. Moreover, a first set of LPLR LTF replicates may be transmitted over even tones, while a second set of LPLR LTF replicates may be transmitted over odd tones. As is described in relation to FIG. 10, the LPLR SIG field may be repeated in time or in frequency, where the replicates of the LPLR SIG field may use different MCS's and/or or have different interleaving and symbol-to-tone mapping schemes. Based on the mode of the data frame and the respective type of the data fields, a specific data field may be detected and/or recovered from the replicates.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory or transitory medium that provides or participates in providing instructions to a processor or other control/processing circuitry of the computing device (e.g., including a wireless receiver, transceiver, etc.) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A system for transmitting data using a low-power low-rate (LPLR) format, the system comprising:
control circuitry coupled to a transmitter configured to:
determine an LPLR frame comprising a first preamble, a second preamble, and a data field;
wherein the first preamble:
occupies a first bandwidth that is centered around a first frequency; and
indicates a second frequency at which a second bandwidth of the second preamble is centered around;
wherein the second preamble:
comprises an LPLR preamble, wherein the LPLR preamble comprises an LPLR short training field, an LPLR long training field, and an LPLR signaling field; and wherein the LPLR short training field comprises a plurality of repeated LPLR STF frames and wherein a respective repeated LPLR STF frame is periodic with a period determined using the second bandwidth, a number of available subchannels, and a number of selected subchannels; and
occupies the second bandwidth that is equal to or less than half the first bandwidth; and
determine a number of copies of the second preamble and the data field, each copy of the number of copies of the second preamble and the data field occupying the second bandwidth at a respective frequency determined by a respective offset from the first frequency; and
a transmitter configured to:
transmit the LPLR frame.

2. The system for transmitting data using an LPLR format of claim 1, wherein the data field has a data field duration and wherein the LPLR long training field comprises:
a guard interval having a guard interval duration that is a multiple of the data field duration; and
a plurality of repeated LPLR LTF frames, wherein a respective repeated LPLR LTF frame is periodic with a period determined using the second bandwidth, a number of available subchannels, and a number of selected subchannels.

3. The system for transmitting data using an LPLR format of claim 1, wherein the LPLR signaling field comprises a plurality of repeated time-domain LPLR signaling frames, and wherein the control circuitry is further configured to:
encode a respective time-domain LPLR signaling frame of the plurality of repeated time-domain LPLR signaling frames that is repeated at a repetition instance by:
applying forward error correction to the respective time-domain LPLR signaling frame;
determining, based on the repetition instance, an interleaved LPLR signaling frame from the corrected respective time-domain LPLR signaling frame;
modulating the interleaved LPLR signaling frame; and
mapping a plurality of symbols of the modulated LPLR signaling frame to a plurality of frequency tones, wherein a frequency tone of the plurality of frequency tones is chosen based on the repetition instance.

4. The system for transmitting data using an LPLR format of claim 1, wherein the LPLR signaling field comprises a plurality of repeated frequency-domain LPLR signaling frames, and wherein the control circuitry is further configured to:

encode a respective frequency-domain LPLR signaling frame of the plurality of repeated frequency-domain LPLR signaling frames by:
repeating the respective frequency-domain LPLR signaling frame;
applying forward error correction to the respective frequency-domain LPLR signaling frame;
determining an interleaved LPLR signaling frame from the corrected respective frequency-domain LPLR signaling frame;
modulating the interleaved LPLR signaling frame; and
mapping a plurality of symbols of the modulated LPLR signaling frame to a plurality of frequency tones.

5. The system for transmitting data using an LPLR format of claim 1, wherein the first frequency is the same as the second frequency.

6. The system for transmitting data using an LPLR format of claim 1, wherein the number of copies is zero.

7. The system for transmitting data using an LPLR format of claim 1, wherein the first preamble further comprises an LPLR SIGA portion.

8. The system for transmitting data using an LPLR format of claim 1, further comprising:
a receiver configured to receive a trigger frame; and
control circuitry coupled to the transmitter further configured to, in response to receiving the trigger frame, determine a shortened second preamble.

9. A method for transmitting data using a low-power low-rate (LPLR) format, the method comprising:
determining an LPLR frame comprising a first preamble, a second preamble, and a data field;
wherein the first preamble:
occupies a first bandwidth that is centered around a first frequency; and
indicates a second frequency at which a second bandwidth of the second preamble is centered around;
wherein the second preamble:
comprises an LPLR preamble, wherein the LPLR preamble comprises an LPLR short training field, an LPLR long training field, and an LPLR signaling field; wherein the LPLR short training field comprises a plurality of repeated LPLR STF frames and wherein a respective repeated LPLR STF frame is periodic with a period determined using the second bandwidth, a number of available subchannels, and a number of selected subchannels; and
occupies the second bandwidth that is equal to or less than half the first bandwidth;
determining a number of copies of the second preamble and the data field, each copy of the number of copies of the second preamble and the data field occupying the second bandwidth at a respective frequency determined by a respective offset from the first frequency; and
transmitting the LPLR frame.

10. The method for transmitting data using an LPLR format of claim 9, wherein the data field has a data field duration and wherein the LPLR long training field comprises:
a guard interval having a guard interval duration that is a multiple of the data field duration; and
a plurality of repeated LPLR LTF frames, wherein a respective repeated LPLR LTF frame is periodic with a period determined using the second bandwidth, a number of available subchannels, and a number of selected subchannels.

11. The method for transmitting data using an LPLR format of claim 9, wherein the LPLR signaling field comprises a plurality of repeated time-domain LPLR signaling frames, further comprising:
encoding a respective time-domain LPLR signaling frame of the plurality of repeated time-domain LPLR signaling frames that is repeated at a repetition instance by:
applying forward error correction to the respective time-domain LPLR signaling frame;
determining, based on the repetition instance, an interleaved LPLR signaling frame from the corrected respective time-domain LPLR signaling frame;
modulating the interleaved LPLR signaling frame; and
mapping a plurality of symbols of the modulated LPLR signaling frame to a plurality of frequency tones, wherein a frequency tone of the plurality of frequency tones is chosen based on the repetition instance.

12. The method for transmitting data using an LPLR format of claim 9, wherein the LPLR signaling field comprises a plurality of repeated frequency-domain LPLR signaling frames, further comprising:
encoding a respective frequency-domain LPLR signaling frame of the plurality of repeated frequency-domain LPLR signaling frames by:
repeating the respective frequency-domain LPLR signaling frame;
applying forward error correction to the respective frequency-domain LPLR signaling frame;
determining an interleaved LPLR signaling frame from the corrected respective frequency-domain LPLR signaling frame;
modulating the interleaved LPLR signaling frame; and
mapping a plurality of symbols of the modulated LPLR signaling frame to a plurality of frequency tones.

13. The method for transmitting data using an LPLR format of claim 9, wherein the first frequency is the same as the second frequency.

14. The method for transmitting data using an LPLR format of claim 9, wherein the number of copies is zero.

15. The method for transmitting data using an LPLR format of claim 9, wherein the first preamble further comprises an LPLR SIGA portion.

16. The method for transmitting data using an LPLR format of claim 9, further comprising:
receiving a trigger frame; and
in response to receiving the trigger frame, determining a shortened second preamble.

* * * * *